US007211231B2

(12) United States Patent
Sylvester et al.

(10) Patent No.: US 7,211,231 B2
(45) Date of Patent: May 1, 2007

(54) ION EXCHANGE MATERIALS FOR USE IN A $^{213}$BI GENERATOR

(75) Inventors: Paul Sylvester, Waltham, MA (US); Abraham Clearfield, College Station, TX (US); Mark L. Dietz, Elmhurst, IL (US)

(73) Assignees: Lynntech, Inc., College Station, TX (US); U Chicago Argonne LLC, Chicago, IL (US); The Texas A&M University System, College Station, TX (US)

( * ) Notice: Subject to any disclaimer, the term of this patent is extended or adjusted under 35 U.S.C. 154(b) by 545 days.

(21) Appl. No.: 10/354,929

(22) Filed: Jan. 30, 2003

(65) Prior Publication Data

US 2004/0069953 A1 Apr. 15, 2004

Related U.S. Application Data

(60) Provisional application No. 60/390,677, filed on Jun. 21, 2002.

(51) Int. Cl.
*C01B 25/26* (2006.01)
*C01G 56/00* (2006.01)

(52) U.S. Cl. .............................. 423/2; 423/6; 423/249; 423/305; 423/DIG. 7; 252/184

(58) Field of Classification Search .................... 423/2, 423/69, 85, 249, DIG. 7, 6, 305; 252/184
See application file for complete search history.

(56) References Cited

U.S. PATENT DOCUMENTS 2,859,093 A 11/1958 Russell et al.
4,112,045 A 9/1978 Seko et al.
4,609,484 A * 9/1986 Alberti et al. .............. 252/184
4,629,656 A * 12/1986 Alberti et al. ........... 428/411.1

(Continued)

FOREIGN PATENT DOCUMENTS

EP 0 250 966 A1 7/1988

(Continued)

OTHER PUBLICATIONS

Linus Pauling "General Chemistry" (1988), Dover Publications Inc., 31 East Street 2nd Street, Mineola, N. Y. 11501, ISBN 0-486-65622-5 (pbk.), pp. 670-671.*

(Continued)

*Primary Examiner*—Timothy C. Vanoy
(74) *Attorney, Agent, or Firm*—Streets & Steele; Jeffrey L. Streets

(57) ABSTRACT

A bismuth-213 generator comprising an insoluble composition having the general formula Zr(Phosponate)$_x$ $(HPO_4)_{2-x}.nH_2O$, wherein x is between 0 and 2; and n is the number of waters of hydration; and wherein cations of radioactive isotopes selected from radium, actinium and combinations thereof are immobilized on the composition. The value of x may be between about 0.2 and about 1. The phosphonate may be n-phosphonomethyl-miniodiacetic acid (PMIDA), wherein x may be between about 0.1 and about 1.9. The phosphonate may be one or more phosphonate having the formula:

$$H_2O_3P—(CH_2)_a—N—((CH_2)_bCO_2H)—((CH_2)_c CO_2H),$$

wherein a, b, and c are numbers from 1 to 3 that may or may not be equal. The value of x may also be between about 0.1 and 1.9.

28 Claims, 3 Drawing Sheets

U.S. PATENT DOCUMENTS

| | | | | | |
|---|---|---|---|---|---|
| 4,631,142 | A * | 12/1986 | Sturtz | | 252/184 |
| 5,072,031 | A * | 12/1991 | Hellring | | 562/8 |
| 5,749,042 | A * | 5/1998 | Bray et al. | | 423/2 |
| 5,854,968 | A * | 12/1998 | Horwitz et al. | | 423/2 |
| 6,153,154 | A * | 11/2000 | Egorov et al. | | 423/2 |
| 6,485,695 | B1 * | 11/2002 | Koch et al. | | 423/2 |
| 6,603,127 | B1 * | 8/2003 | Scheinberg et al. | | 250/432 PD |
| 6,852,296 | B2 * | 2/2005 | Bond et al. | | 423/2 |
| 2005/0167609 | A1 * | 8/2005 | Egorov et al. | | 250/423 P |

FOREIGN PATENT DOCUMENTS

| | | | |
|---|---|---|---|
| EP | 0 585 986 | A1 | 3/1994 |
| JP | 61086953 | | 2/1986 |

OTHER PUBLICATIONS

Dangshe Ma, Michael R. McDevitt, Ronald D. Finn,David A. Scheinberg; Breakthrough of $^{225}$Ac and its radionuclide daughters from an $^{225}$Ac/$^{213}$Bi generator; development of new methods, quantitative characterization, and implications for clinical use; Applied Radiation and Isotopes 55 (2001) 667-678.

* cited by examiner

ION EXCHANGE MATERIALS FOR USE IN A $^{213}$Bi GENERATOR

This application claims priority to Provisional Application No. 60/390,677 filed Jun. 21, 2002.

"This invention was made with government support under grant number 1 R43 CA83568-01 awarded by the National Institutes of Health (NIH). The government has certain rights in this invention."

BACKGROUND OF THE INVENTION

1. Field of the Invention

The present invention relates to radionuclide generators, ion exchange materials for radionuclide generators and methods of making these materials.

2. Description of the Related Art

The use of alpha-emitting radionuclides in the treatment of specific forms of cancers has become increasingly of interest in recent years. Alpha particles are far more effective in the destruction of cancer cells than gamma or beta particles due to their greater linear energy transfer (LET) rates. Bismuth-213 ($^{213}$Bi) has been identified as an important radioisotope for use in this new field of radiomedicine.

In order for an isotope to be used in medical applications, the isotope should be of high purity to avoid introduction of undesirable radioactive isotopes into the body that would deliver an unnecessary dose to sensitive areas of the body such as the bone marrow. $^{213}$Bi is produced as a daughter product in the decay of $^{229}$Th, which is itself a daughter product of the decay of $^{233}$U. $^{213}$Bi has a short half-life of only about 45 minutes, which means that it rapidly decays away once introduced into the body. This also means that the isotope should be supplied in the form of a generator in which a suitable parent isotope is immobilized on an ion exchange material so that the $^{213}$Bi can be eluted when required. $^{225}$Ac is a parent isotope of choice that can be immobilized and shipped to medical facilities. The $^{229}$Th decay series that includes $^{213}$Bi is shown in FIG. 1.

Alpha particles are extremely destructive towards conventional organic ion exchange resins, which leads to limited generator life, bleed of undesirable $^{225}$Ac into the $^{213}$Bi product and the possible release of pyrogens into the aqueous phase during $^{213}$Bi elution.

Therefore, there is a need for a radionuclide generator, such as a $^{213}$Bi generator, that has improved stability against alpha particles and other forms of ionizing radiation. It would be desirable if the generator provided high separation and high stability in order to yield a solution with substantially no parent isotope and no by products of generator decomposition.

SUMMARY OF THE INVENTION

The present invention provides a radionuclide generator comprising an organic zirconium phosphate or phosphonate composition. This composition is preferably prepared by reacting a source of zirconium with a mixture of phosphoric acid and a substituted phosphoric or phosphonic acid. Before use, cations of one or more radioisotopes are immobilized on the composition. The source of zirconium may be soluble and may be $ZrOCl_2$.

A preferred embodiment provides a bismuth-213 generator comprising an insoluble composition having the general formula $Zr(Phosponate)_x(HPO_4)_{2-x}.nH_2O$, wherein x is between 0 and 2; and n is the number of waters of hydration, preferably between 0.5 and 2.5; and wherein cations of radioactive isotopes selected from radium, actinium and combinations thereof are immobilized on the composition. A preferred phosphonate is n-phosphonomethyl-miniodiacetic acid (PMIDA), wherein x is preferably between about 0.1 and about 1.9. The phosphonate may also be one or more phosphonate having the formula: $H_2O_3P—(CH_2)_a—N—((CH_2)_bCO_2H)—((CH_2)_cCO_2H)$, wherein a, b, and c are numbers from 1 to 3 that may or may not be equal. The value of x is preferably between about 0.1 and about 1.9. Optionally, the bismuth-213 generator comprises an elutable container defining an eluant flow path, the container containing a matrix comprising a substantially non-elutable inorganic layered zirconium phosphate and/or zirconium phosphonate compound containing actinium-225. The preferred ratios of phosphate to phosphonate are between about 0.1 and about 10. In one embodiment, the phosphonate is n-phosphonomethyl-miniodiacetic acid (PMIDA). In another embodiment, the phosphonate includes one or more phosphonate having the formula $H_2O_3P—(CH_2)_a—N—((CH_2)_bCO_2H)—((CH_2)_cCO_2H)$, wherein: a, b, and c are numbers from 1 to 3 that may or may not be equal. The bismuth-213 is produced by the decay of the actinium-225.

A further embodiment provides a radionuclide generator for producing bismuth-213 comprising an insoluble inorganic layered phosphate or phosphonate matrix including a compound containing actinium-225, the matrix being permeable to fluid passage and permitting diffusion of bismuth-213 through the matrix. The matrix is preferably prepared by reacting a mixture of phosphoric acid and a substituted phosphoric or phosphonic acid with a source of zirconium. Optionally, the source of zirconium is soluble. Furthermore, the source of zirconium is optionally ZrOCl2.

Yet another embodiment provides a method comprising immobilizing cations of radioactive isotopes selected from radium-225, actinium-225 and combinations thereof onto an insoluble zirconium phosphate/phosphonate cation exchange composition; and eluting bismuth-213 from the insoluble composition with an aqueous solution. Optionally, the aqueous solution may comprise a complexing agent, such as ethylenediaminetriacetic acid. Alternatively, the complexing agent may be selected from ethylenediaminetriacetic acid, nitrilotriacetic acid, citric acid, hydroxyethyl ethylenediaminetriacetic acid, and combinations thereof.

Preferably, the generator composition or matrix is characterized by an actinium/bismuth separation factor greater than 100. The composition or matrix is characterized by an actinium/bismuth separation factor greater than 1,000; greater than 2,000; or greater than 3,000. The bismuth-213 is produced from the decay of actinium-225. Optionally, the aqueous solution used to elute bismuth-213 may have a neutral pH. Further, the aqueous solution may, if desired, comprise a salt of a weak acid.

The foregoing and other objects, features and advantages of the invention will be apparent from the following more particular description of preferred embodiments of the invention, as illustrated in the accompanying figures.

DETAILED DESCRIPTION

This invention relates to the synthesis of novel zirconium phosphates and phosphonate materials that can be utilized for the production of pure $^{213}Bi$ from the decay of $^{225}Ac$. These materials exhibit high selectivities towards mildly acidic solutions of lanthanum (a surrogate for Actinium) while exhibiting low selectivity towards bismuth ions under similar conditions. Consequently, lanthanum (and thus actinium) can be loaded onto the material and the decay product, $^{213}Bi$, eluted as required.

The materials described in this disclosure are organic derivatives of zirconium phosphate, $Zr(HPO_4)_2.H_2O$. Details of the preferred syntheses of some of these materials are given below. However, in general terms, the materials are manufactured by mixing a soluble source of zirconium (e.g. $ZrOCl_2$) with a mixture of phosphoric acid and a substituted phosphonic or phosphoric acid. The mixture is then heated, refluxed or hydrothermally treated for a period of time ranging from a few minutes to a week or more. Preferably the white solid product is then filtered, washed and dried. Optionally, HF may also be used in the synthesis to improve the crystallinity of the product.

EXAMPLE 1

Synthesis of Zr $(HPO_4)_xPMIDA_{(2-x)}.nH_2O$

Figure 1:
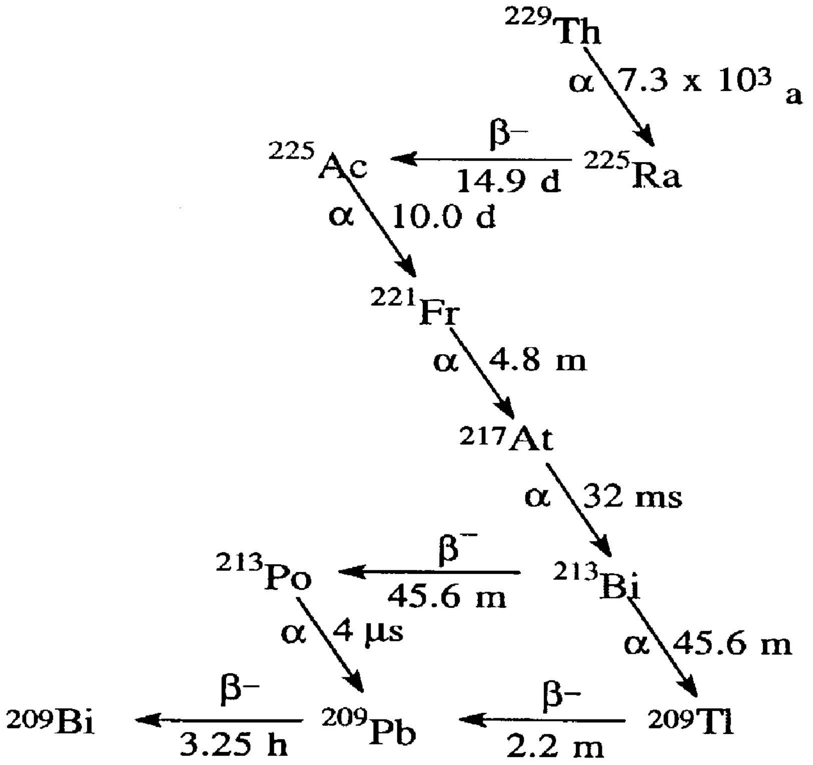
FIG. 1 is a chart showing the decay series that includes Bi-213.
Figure 2:
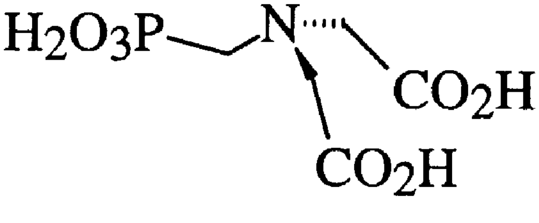
FIG. 2 shows the chemical structure of N-Phosphonomethyliminodiacetic Acid.

Zirconium PMIDA derivatives have been shown to have a high affinity for polyvalent cations such as lanthanum, $La^{3+}$, from weakly acidic media. Lanthanum ions will interact with the two carboxylic acid groups and may also interact with the lone pair of electrons associated with the nitrogen atom. The structure of PMIDA, N-Phosphonomethyliminodiacetic Acid, is shown in FIG. 2.

A series of zirconium PMIDA/phosphate materials with the general formula $Zr[(PMIDA)_x(HPO_4)_{2-x}].nH_2O$ were synthesized where x varied from 0.2 to 1. A typical synthesis is described as follows. 1.33 g of PMIDA (10 mmol) and 0.48 mL of concentrated phosphoric acid (10 mmol) were dissolved in 10 mL of deionized water and 3.22 g of zirconyl chloride octahydrate (10 mmol) dissolved in 10 mL of deionized water was added drop wise with constant stirring. The resultant gel was then placed in a hydrothermal bomb with 2 mL of 48% HF and heated at 120° C. for 48 hours. The white product was then filtered, washed with water to remove residual HF and dried at 50° C.

EXAMPLE 2

Zirconium 4,4'-Phenyldiphosphonic Acid (PDPA) Derivatives

Zirconium PDPA derivatives were prepared in a similar manner to the PMIDA derivatives described in Example 1 to produce a series of materials with the general formula $Zr[(PDPA)_x(HPO_4)_{2-2x}].nH_2O$, where x was varied from 0.1 to 0.5. These materials consisted of a layered structure permanently bridged by a phenyl group with $HPO_4$ groups attached to each layer. The structure is similar to the BPBPA derivative shown in FIG. 3, except that the layers are separated by one phenyl group instead of two, thus limiting the access to the exchange sites on the phosphate groups to smaller ions. By varying the relative concentrations of phosphoric acid and PDPA in the starting mixture, it is possible to vary the density of the bridging PDPA moiety and thus vary the pore size and ion exchange properties of the final material. Since the PDPA is an inert bridging functionality, the ion exchange capacity of the material will be dependent upon the number of $HPO_4$ groups present. Consequently, as the percentage PDPA increases, the ion exchange capacity will decrease and will be zero for the pure $Zr(PDPA)_2$ material. Low ion exchange capacity is, however, not a problem due to the low masses of $^{225}Ac$ that will need to be absorbed onto the ion exchange column in the $^{213}Bi$ generator.

EXAMPLE 3

Zirconium 4,4'Biphenylbis(phosphonic) Acid (BPBPA) Derivatives

Figure 3:
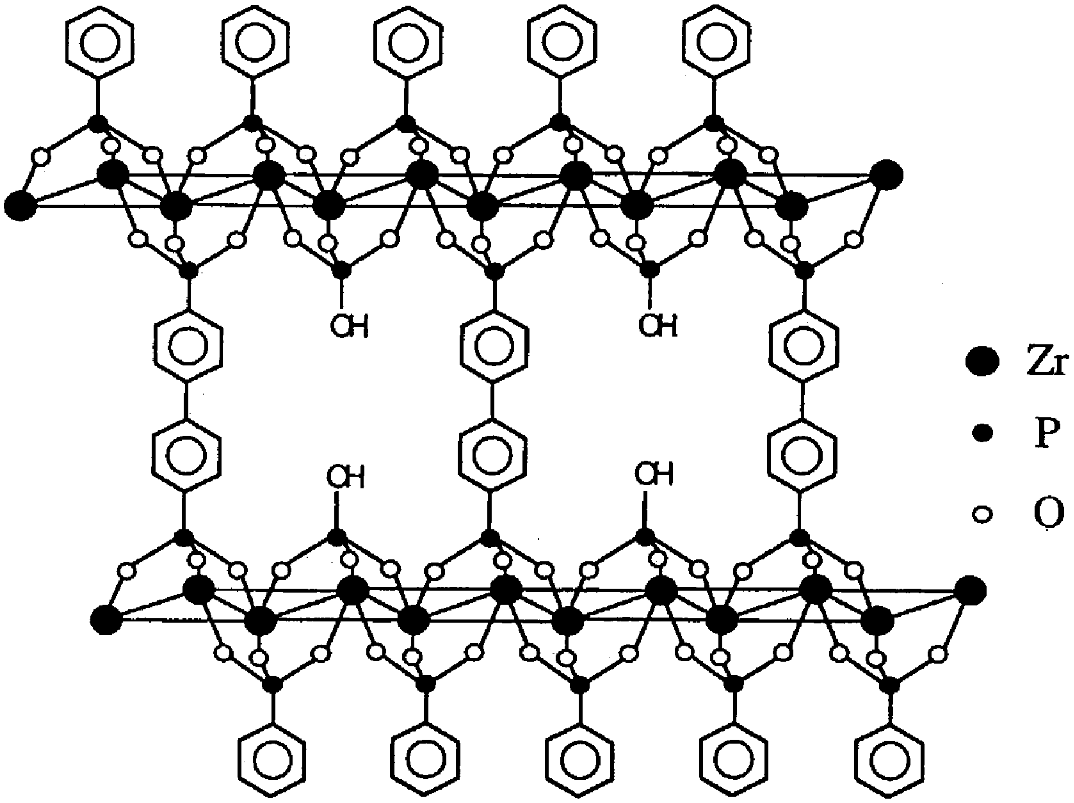
FIG. 3 illustrates the structure of the Zirconium Phosphate/BPBPA Derivative $Zr[(BPBPA)HPO_4].nH_2O$.

The idealized structure of the zirconium phosphate/BPBPA derivatives is shown in FIG. 3. The BPBPA derivative serves to act as a rigid pillar, similar to the PDPA groups, separating the inorganic zirconium phosphate layers. Ion exchange reactions occur at the protons associated with the phosphate groups. As described previously for PDPA derivatives, varying the proportions of phosphoric acid and BPBPA in the reactant mixture will produce different ratios of pillars to phosphate groups in the final product leading to a range of pore sizes and ion exchange properties. The ion exchange capacity will also decrease as the BPBPA content increases. These materials were synthesized according to the procedure described in Example 2, using BPBPA in place of PDPA.

EXAMPLE 4

Other Zirconium Mixed Phosphate/Phosphonates

In addition to the materials outlined previously, a pure $Zr(PMIDA)_2.nH_2O$ material and the mixed derivative Zr(PMIDA)(PDPA) were synthesized. The synthetic procedures were very similar to those described in the foregoing examples, except that the gels formed were heated at 160° C. instead of 120° C.

The ion exchange properties of synthesized materials were investigated using simple batch experiments. In order to promote safety, reduce costs, and allow a greater number of materials to be screened, the ion exchange experiments were mostly performed using inactive isotopes or appropriate surrogates. Bismuth distribution coefficients ($K_d$s) were determined using bismuthyl perchlorate, $BiOClO_4$, solutions in sodium chlorate media to ensure that no precipitation of bismuth occurred. Barium and lanthanum were used as surrogates for radium and actinium, respectively, and these experiments were performed in nitrate media. The solutions used to evaluate ion exchange selectivity were generally 0.1M in $Na^+$ in order to maintain a constant ionic strength during the experiments. The initial pH of the solutions was adjusted to approximately pH 3.5 using either dilute nitric or perchloric acid prior to contact with the ion exchangers. The concentrations of the ions in solution were analyzed using atomic absorption spectrometry (AAS).

Ion exchange material (0.05 g) was contacted with 20 mL of a 25 ppm solution of Bi, Ba or La, for 24 hours using a rotary shaker. The mixture was then filtered through a 0.2 μm syringe filter, the pH measured, and the aqueous phase analyzed by AAS. Prior to analysis, Bi samples were acidified with concentrated nitric acid to prevent any precipitation of bismuth salts on standing. Early experiments had indicated that there was limited stability of aqueous solutions of bismuthyl perchlorate. Consequently, all solutions were made up fresh immediately prior to use and blanks were run with each set of experiments to check for precipitation. $K_d$s for bismuth, barium and lanthanum were then determined according to Equation 1:

$$K_d=((C_i-C_f)/C_f)\cdot v/m \quad (1)$$

Where: $C_i$=initial concentration of ion in solution
$C_f$=final concentration of ion in solution
v=volume of solution (ml)
m=mass of exchanger (g)

A limited number of experiments were performed using radiotracers in support of work performed with inactive surrogates. This check of the $K_d$ determinations served to ensure that the results obtained using ppm levels of ions was relevant to generator conditions, where the actual concentrations of ions present in solution would be several orders of magnitude less. In the radiotracer experiments, 0.02 g of ion exchange material was equilibrated with 1 mL of a 0.1 M NaCl solution, spiked with $^{210}$Bi ($T_{1/2}$=5.01 days), for 3 hours. The mixture was then passed through a 0.2 μm filter and counted using liquid scintillation counting. $K_d$s were then determined as described above.

Ion Exchange Selectivity of the PMIDA Derivatives

The ion exchange data for the zirconium phosphate/PMIDA derivatives is given in Table 1. Also included are ion exchange data for both amorphous and crystalline zirconium phosphate, $Zr(HPO_4)_2.H_2O$.

The PMIDA derivatives are an attractive series of materials having much lower affinities for bismuth than for lanthanum, apart from the 50% PMIDA derivative, and fairly low barium selectivity. The trend is for lanthanum $K_d$s to increase with decreasing PMIDA content. Bi $K_d$s also increase, but remain substantially less than the lanthanum $K_d$. Barium $K_d$s are generally low. The radiotracer work was in relatively good agreement with the data obtained using inactive surrogates, particularly with the lower PMIDA materials. This indicates the bismuth results using inactive bismuth salts are representative of the behavior of bismuth at radiotracer concentrations.

TABLE 1

La, Bi and Ba $K_d$s for the Zirconium Phosphate/PMIDA Derivatives

| Sample ID | Phosphate: PMIDA | La $K_d$ mL/g | *Bi $K_d$ mL/g | Ba $K_d$ mL/g | La/Bi Sep. Factor |
|---|---|---|---|---|---|
| KS-40-1 | 50:50 | 791 | 821 | 51 | 0.96 |
| KS-40-2 | 60:40 | 8,750 | 205 (*1850*) | 2 | 43 |
| KS-40-3 | 70:30 | 5,950 | 373 (*901*) | 78 | 16 |
| KS-40-4 | 80:20 | 4,900 | 1014 (*1030*) | 118 | 4.8 |
| KS-40-5 | 90:10 | 10,700 | 2940 (*2700*) | 332 | 3.6 |
| Amor. ZrP | 100:0 | 3,400 | >19,000 | 705 | <0.18 |
| Cryst ZrP | 100:0 | <1 | 303 | 5 | <0.003 |

*Values in Italics and parenthesis determined independently at ANL using radioactive $^{210}$Bi tracer Ion Exchange Selectivity of the BPBPA Derivatives The selectivity data for the zirconium phosphate/BPBPA derivatives is given in Table 2.

TABLE 2

La, Bi and $K_d$s for the Zirconium Phosphate/BPBPA Derivatives

| Sample ID | Phosphate: BPBPA | La $K_d$ mL/g | Bi $K_d$ mL/g | Ba $K_d$ mL/g | La/Bi Sep. Factor |
|---|---|---|---|---|---|
| KS-41-1 | 50:50 | 489 | >19,900 | 62 | <0.025 |
| KS-41-2 | 60:40 | 916 | >19,900 | 117 | <0.046 |
| KS-41-3 | 70:30 | 849 | >19,900 | 86 | <0.043 |
| KS-41-4 | 80:20 | 2540 | >19,900 | 48 | <0.13 |
| KS-41-5 | 90:10 | >27,000 | >19,900 | 92 | 1.35 |

The zirconium phosphate/BPBPA derivatives, other than the 10% BPBPA sample, exhibit lanthanum affinities that may be too low to warrant further study. The cross-linking BPBPA moiety consists of two aromatic rings and would be expected to be highly hydrophobic. The low lanthanum selectivities may be due to the polar, highly hydrated $La^{3+}$ ions being repelled by these hydrophobic centers. Consequently, the selectivity would be expected to increase as the percentage of the BPBPA decreases. This is seen in the analytical data with the maximum $K_d$s being observed when the BPBPA component composed only 10%.

The bismuth affinities of all samples were very high. This may be because the bismuth species in solution is less polar with a much smaller hydration sphere and is thus able to access the available ion exchange sites. High bismuth selectivity is not too desirable because this indicates that the $^{213}$Bi daughter would remain strongly bound to the ion exchange column. However, this affinity can be overcome by using chelating agents to form Bi complexes and reduce the affinity of the ion exchanger for bismuth.

Barium $K_d$s are fairly low for all of these materials. This means that any $^{225}$Ra in the 225Ac solution used to load the generator will only be weakly absorbed and thus can be readily removed by washing the column immediately after loading with $^{225}$Ac has been completed.

Ion Exchange Selectivity of the PDPA Derivatives

The ion exchange selectivities of the zirconium phosphate/PDPA derivatives are given in Table 3.

TABLE 3

La, Bi and Ba $K_d$s for the Zirconium Phosphate/PDPA Derivatives

| Sample ID | Phosphate: PDPA Ratio | La $K_d$ mL/g | Bi $K_d$ mL/g | Ba $K_d$ mL/g | La/Bi Sep. Factor |
|---|---|---|---|---|---|
| KS-I-49(A) | 50:50 | 2,850 | >13,500 | 503 | <0.22 |
| KS-I-49(B) | 60:40 | 11,400 | >13,500 | 1,140 | <0.84 |
| KS-I-49(C) | 70:30 | 2,980 | >13,500 | 500 | <0.22 |
| KS-I-49(D) | 80:20 | ND | >13,500 | 1,270 | ? |

ND - Not Determined

The data in Table 3 shows that the PDPA derivatives all show a high affinity for bismuth and relatively high selectivity towards lanthanum. However, the affinity for barium is high and, by analogy, the selectivity for radium would also be expected to be high. Consequently, this class of materials is less preferred than to the other materials investigated.

Other Zirconium Phosphate/Phosphonates

The ion exchange data for the pure $Zr(PMIDA)_2$ materials and the mixed Zr(PMIDA)(PDPA) mixed derivative are shown below in Table 4.

TABLE 4

Ion Exchange Data for the Pure Zirconium PMIDA Material and the Mixed PMIDA/PDPA Derivative

| Sample ID | Ligands | La $K_d$ mL/g | Bi $K_d$ mL/g | Ba $K_d$ mL/g |
|---|---|---|---|---|
| KS-I-54-1 | 100% PMIDA | 4,610 | >17,200 | 61 |
| KS-I-54-3 | 50% PMIDA, 50% PDPA | 16,500 | >17,200 | 78 |

This data shows that it is still possible to obtain a high lanthanum selectivity with a pure zirconium PMIDA derivative. However, unlike the data in Table 2, the pure PMIDA material was also found to have a high selectivity for bismuth. This suggests that the selectivity for La over Bi achieved using the mixed phosphate/PMIDA derivative was dependent upon structural factors. Combining the PMIDA ligand with PDPA to produce a pillared layered material produced a higher La selectivity. However, this material also possessed a high bismuth $K_d$. Repeat bismuth $K_d$ determinations and absorption blanks, coupled with acidic final pH values confirmed that the bismuth was removed from solution by ion exchange rather than precipitation.

Effect of pH on Lanthanum Absorption

The effect of pH on both the uptake of lanthanum (or actinium) and the elution of bismuth is an important factor. In high acid concentrations, protons will compete for the ion exchange sites on the materials and thus reduce uptake of other species and displace absorbed ions. To allow a material to be successfully used in a generator, it is therefore important to define a pH range where the generator can be loaded and eluted. The upper pH limit is defined by the precipitation of hydroxides of La, Ba and Bi which were found experimentally to occur at approximately pH 8.55, 11.58 and 6.65, respectively. The lower limit is defined by the level of acidity at which the selectivity of the material towards lanthanum (actinium) becomes too low. Experiments in acidic media showed that the lanthanum $K_d$s decreased rapidly as the acidity of the solution was increased. At a pH<1, lanthanum $K_d$s were negligible and, as a consequence, it is therefore desirable to load and elute a $^{213}Bi$ generator at a slightly acid pH in order to maximize lanthanum(actinium) $K_d$s and to prevent any precipitation of bismuth, lanthanum(actinium) or barium(radium) salts.

Kinetic Studies

Ideally, the rate of absorption of ions by the ion exchange material needs to be rapid. This will allow quick, easy loading of the generator and the elution of $^{213}Bi$ in the minimum volume of liquid. Screening studies used a contact time of 24 hours, which was deemed to be sufficient for equilibrium to be obtained. Selected materials that exhibited a high selectivity for lanthanum ions were then investigated to determine the rate of reaction.

A 0.05 g quantity of KS-I-54-3 (a PMIDA/PMDP derivative) was contacted for a measured time with 20 mL of a 25 ppm solution of $La^{3+}$ in 0.1M $NaNO_3$ at pH 3.35. After the allotted time, the mixture was filtered and the residual lanthanum in solution measured by AAS. The final pH was also measured and found to have remained constant at pH 3.0+/−0.05. The results are shown below in FIG. 4.

Figure 4:
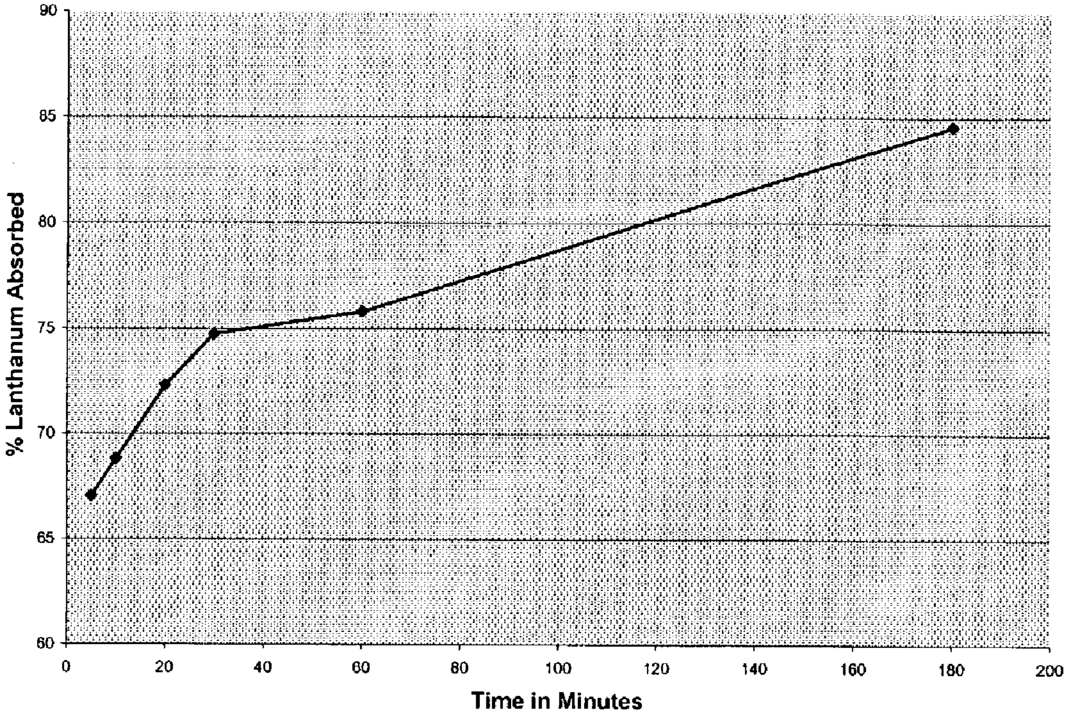
FIG. 4 is a chart showing the Lanthanum Absorption Kinetics.

FIG. 4 indicates that the reaction rate is rapid with over 65% of the lanthanum present being absorbed within 5 minutes. Absorption of lanthanum continues to increase with time, with almost 85% of the available lanthanum ions being absorbed after 3 hours. This rapid reaction rate will ensure that the ion exchange materials can be quickly loaded with $^{225}Ac$. In a generator situation, the uptake of $^{225}Ac$ would be expected to be considerably more rapid than lanthanum. The very low concentrations of actinium present means that diffusion through the ion exchanger will not be necessary because there are likely to be sufficient surface groups to absorb all of the actinium present in the loading solution. Thus, the uptake will not be limited by mass diffusion of the ions through the bulk of the ion exchanger.

Effect of Chelating Agents

Five common chelating agents were assessed in an attempt to improve the separation of bismuth from lanthanum using the available ion exchange materials.

These were:
1) Ethylenediaminetetraacetic acid, EDTA
2) Nitrilotriacetic Acid, NTA
3) Citric Acid
4) Iminodiacetic Acid (IDA)
5) N-(2-Hydroxyethyl)ethylenediaminetriacetic acid (HEDTA)

These complexants were then added to solutions of $La^{3+}$ and $Bi^{3+}$ and the ion exchange selectivities redetermined following the methods described previously. The stability constants for these complexants are given in Table 5. The stability constant ($K_{stab}$) is defined by Equation 2:

$$K_{stab}=[MY^{z-x}]/[M^{z+}][Y^{x-}] \quad (2)$$

where: M=metal cationz=cation charge
x=ligand chargeY=chelant

TABLE 5

| Stability of $Bi^{3+}$ and $La^{3+}$ Complexes | | |
|---|---|---|
| Ligand | Log K, $Bi^{3+}$ | Log K, $La^{3+}$ |
| EDTA | 27.8 | 15.5 |
| Citric acid | 10.78 | 6.65 |
| NTA | 17.5 | 10.47 |
| IDA | Not Available | 5.88 |
| HEDTA | 22.3 | 13.61 |

The stability data for $Bi^{3+}$ was incomplete, but it is clear that from the complexing agents for which data was available, that $Bi^{3+}$ forms complexes which are many orders of magnitude more stable than the corresponding $La^{3+}$ complexes. Thus, it is theoretically possible to use a chelating agent to selectively strip Bi from an ion exchange material and achieve the desired separation factor. This concept was then proven experimentally in the sections described below.

Stability of Bi Complexes in NaCl

The stability of Bi complexes with the ligands in Table 5 was evaluated in NaCl solutions. A $10^{-3}$M solution of ligand in $10^{-3}$, $10^{-2}$ and $10^{-}$M NaCl solutions (adjusted to pH 4) were spiked with a 250 ppm solution of $BiOClO_4$ to give a total bismuth concentration of approximately 25 ppm. The IDA solutions produced a white precipitate in $10^{-2}$ M and $10^{-1}$ M solutions of NaCl, suggesting the formation of insoluble BiOCl. The other solutions exhibited no evidence of precipitation but analysis of the Bi concentration in the filtered solutions by AAS suggested a small amount of Bi precipitation had occurred with the HEDTA solutions in $10^{-1}$M NaCl. This indicates that HEDTA and IDA formed relatively weak complexes with bismuth under the conditions studied and, consequently, EDTA, NTA and citric acid are the most preferred as potential stripping agents.

Effect of Citric Acid, EDTA and NTA on Bi and La $K_d$s

The effect of citric acid, EDTA and NTA on La and Bi Kds was determined using a simple batch technique. Sample KS-I-49(B) was used to evaluate the effect of the complexants. 0.05 g of ion exchange material was contacted for 24 hours with 20 mL of a 25 ppm solution of either Bi or La in 0.1M NaCl, containing 0.001M solution of the complexants at a pH~4. The mixture was shaken for 24 hours and the residual Bi and La in solution after filtration determined by AAS. Blank experiments showed no precipitation of Bi or La during the procedure. The results are shown in Table 6.

TABLE 6

| Separation of La and Bi utilizing Complexants | | | |
|---|---|---|---|
| Complexant | La $K_d$ mL/g | Bi $K_d$ mL/g | Separation Factor, $\alpha$ |
| None | 11,400 | >13,500* | <0.8 |
| EDTA | 3080 | <1 | >3,080 |
| NTA | 11,400 | 6 | 1,900 |
| Citric Acid | 14,000 | 3,610 | 3.9 |

*$K_d$ was determined in perchlorate media to maintain Bi solubility.

From the data in Table 6, it may be seen that the addition of NTA or EDTA greatly improved the separation of Bi and La. NTA and citric acid had a negligible affect on the La $K_d$s, but reduced the Bi $K_d$s to <10 mL/g. This may demonstrate how the La/Bi separation factor, $\alpha$, can be improved by the addition of minor amounts of a complexant to the eluting solution. ($\alpha$ is the La $K_d$ divided by the Bi $K_d$.) For medical applications, the amount of complexant required to complex the $^{213}$Bi daughter will be negligible. Thus, the $^{213}$Bi complex eluted from the generator can be destroyed in a matter of minutes using a safe oxidant such as ozone, UV irradiation or hydrogen peroxide, allowing rapid processing of the $^{213}$Bi to be performed in order to synthesize the radiopharmaceutical. However, an alternative approach is to elute the bismuth using a solution of a complexant, such as derivatives of diethylenetriaminepentaacetic acid (DTPA), to produce a radiopharmaceutical (or radiopharmaceutical precursor) direct from the $^{213}$Bi generator. This $^{213}$Bi complex may then be rapidly processed further and attached to an antibody.

These experiments demonstrate that zirconium phosphate-based ion exchange materials may successfully separate bismuth from lanthanum and therefore can be used in a $^{213}$Bi generator. It has also been shown that complexants may be used to enhance the La/Bi separation factors with separation factors in excess of 3,000 for La/Bi being obtained.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A radioactive isotope generator, comprising:

an elutable container defining an eluant flow path through a fluid permeable matrix comprising a substantially non-elutable and insoluble composition having the general formula:

$$Zr(Phosphonate)_x(HPO_4)_{2-x}*nH_2O$$

wherein: x is between 0 and 2, and n is the number of waters of hydration; and wherein cations of one or more radioactive parent isotopes are immobilized on the composition.

2. The generator of claim 1 wherein the one or more radioactive parent isotopes are selected from radium, actinium and combinations thereof.

3. The generator of claim 1, wherein x is between 0.2 and 1.

4. The generator of claim 1, wherein the phosphonate is n-phosphonomethyl-miniodiacetic acid (PMIDA, $N(CH_2CO_2H)_2(CH_2PO_3H_2)$).

5. The generator of claim 4, wherein x is between 0.1 and 1.9.

6. The generator of claim 1, wherein the phosphonate is one or more phosphonate having the formula:

$$H_2O_3P—(CH_2)_a—N—((CH_2)_bCO_2H)—((CH_2)_cCO_2H)$$

wherein: a, b, and c are numbers from 1 to 3 that may or may not be equal.

7. The generator of claim 1, wherein x is between 0.1 and 1.9.

8. The generator of claim 1, wherein x is between 0.2 and 1.

9. A radioactive isotope generator comprising an elutable container defining an eluant flow path, the container containing a matrix comprising a substantially non-elutable inorganic layered zirconium compound containing a mixture of phosphate and phosphonate ligands, the compound containing a parent radioactive isotope.

10. The generator of claim 9, wherein the ratio of phosphate to phosphonate is between 0.1 and 10.

11. The generator of claim 9, wherein the phosphonate is n-phosphonomethyl-miniodiacetic acid (PMIDA).

12. The generator of claim 9, wherein the phosphonate is one or more phosphonate having the formula:

$$H_2O_3P—(CH_2)_a—N—((CH_2)_bCO_2H)—((CH_2)_cCO_2H)$$

wherein: a, b, and care numbers from 1 to 3 that may or may not be equal.

13. The generator of claim 9, wherein the radioactive isotope is produced by the decay of the parent radioactive isotope.

14. A radionuclide generator comprising an elutable container defining an eluant flow path, the container containing an insoluble inorganic layered phosphate or phosphonate matrix including a compound containing actinium-225, the matrix being permeable to fluid passage and permitting diffusion of a daughter isotope through the matrix.

15. The generator of claim 14, wherein the matrix is prepared by reacting a mixture of phosphoric acid and a substituted phosphoric or phosphonic acid with a source of zirconium.

16. The composition of claim 14, wherein the source of zirconium is soluble.

17. The composition of claim 14, wherein the source of zirconium is $ZrOCl_2$.

18. A method comprising:

immobilizing cations of a radioactive parent isotope onto an insoluble matrix of a cation exchange composition selected from zirconium phosphate, zirconium phosphonate, or combinations thereof; and eluting daughter isotopes from the insoluble composition with an aqueous solution.

19. The method of claim 18, wherein the aqueous solution comprises a complexing agent.

20. The method of claim 19, wherein the complexing agent is ethylenediaminetetraacetic acid.

21. The method of claim 19, wherein the complexing agent is selected from ethylenediaminetetraacetic acid, nitrilotriacetic acid, citric acid, hydroxyethyl ethylenediaminetriacetic acid, and combinations thereof.

22. The method of claim 19, wherein the aqueous solution has a neutral pH.

23. The method of claim 19, wherein the aqueous solution comprises a salt of a weak acid.

24. The method of claim 18, wherein the composition is characterized by an actinium/bismuth separation factor greater than 100.

25. The method of claim 18, wherein the composition is characterized by an actinium/bismuth separation factor greater than 1,000.

26. The method of claim 18, wherein the composition is characterized by an actinium/bismuth separation factor greater than 2,000.

27. The method of claim 18, wherein the composition is characterized by an actinium/bismuth separation factor greater than 3,000.

28. The method of claim 18, wherein the bismuth-213 is produced from the decay of actinium-225.

* * * * *

UNITED STATES PATENT AND TRADEMARK OFFICE

CERTIFICATE OF CORRECTION

PATENT NO. : 7,211,231 B2
APPLICATION NO. : 10/354929
DATED : May 1, 2007
INVENTOR(S) : Paul Sylvester, Abraham Clearfield and Mark L. Dietz It is certified that error appears in the above-identified patent and that said Letters Patent is hereby corrected as shown below:

At column 1, line 10, insert the following:

The United States Government has rights in this invention pursuant to Contract Number W-31-109-ENG-38 between the U.S. Department of Energy (DOE) and The University of Chicago representing Argonne National Laboratory.

Signed and Sealed this

First Day of April, 2008

JON W. DUDAS
*Director of the United States Patent and Trademark Office*